United States Patent [19]

Brush

[11] 4,311,879
[45] Jan. 19, 1982

[54] AC SUPERVISORY SIGNAL DETECTOR CIRCUIT

[75] Inventor: Douglas J. Brush, Lombard, Ill.

[73] Assignee: GTE Automatic Electric Labs Inc., Northlake, Ill.

[21] Appl. No.: 155,700

[22] Filed: Jun. 2, 1980

[51] Int. Cl.³ .............................................. H04M 7/00
[52] U.S. Cl. .............................................. 179/18 AH
[58] Field of Search ............. 179/84 A, 84 R, 18 AH, 179/99 LC

[56] References Cited

U.S. PATENT DOCUMENTS

| | | | |
|---|---|---|---|
| 4,066,848 | 1/1978 | Darwood | 179/84 R |
| 4,133,982 | 1/1979 | Lee et al. | 179/18 AH |
| 4,184,053 | 1/1980 | Saneyoshi | 179/84 R |
| 4,190,745 | 2/1980 | Jusinskas, Jr. et al. | 179/18 AH |

FOREIGN PATENT DOCUMENTS 2317831  2/1977 France .............................. 179/84 R

OTHER PUBLICATIONS

"Telephone-Ring Detector Eliminates Relay", J. Gwinn, *Electronics,* vol. 49, No. 24, Nov. 25, 1976, pp. 112-113.

*Primary Examiner*—Thomas W. Brown
*Attorney, Agent, or Firm*—Robert J. Black; Gregory G. Hendricks

[57] ABSTRACT

An AC supervisory signal detector circuit for use in conjunction with a trunk circuit of a PABX telephone system connected to a telephone central office. Valid AC supervisory signals are detected to the exclusion of noise signals and response time for detection of termination of AC supervisory signals is improved.

5 Claims, 1 Drawing Figure

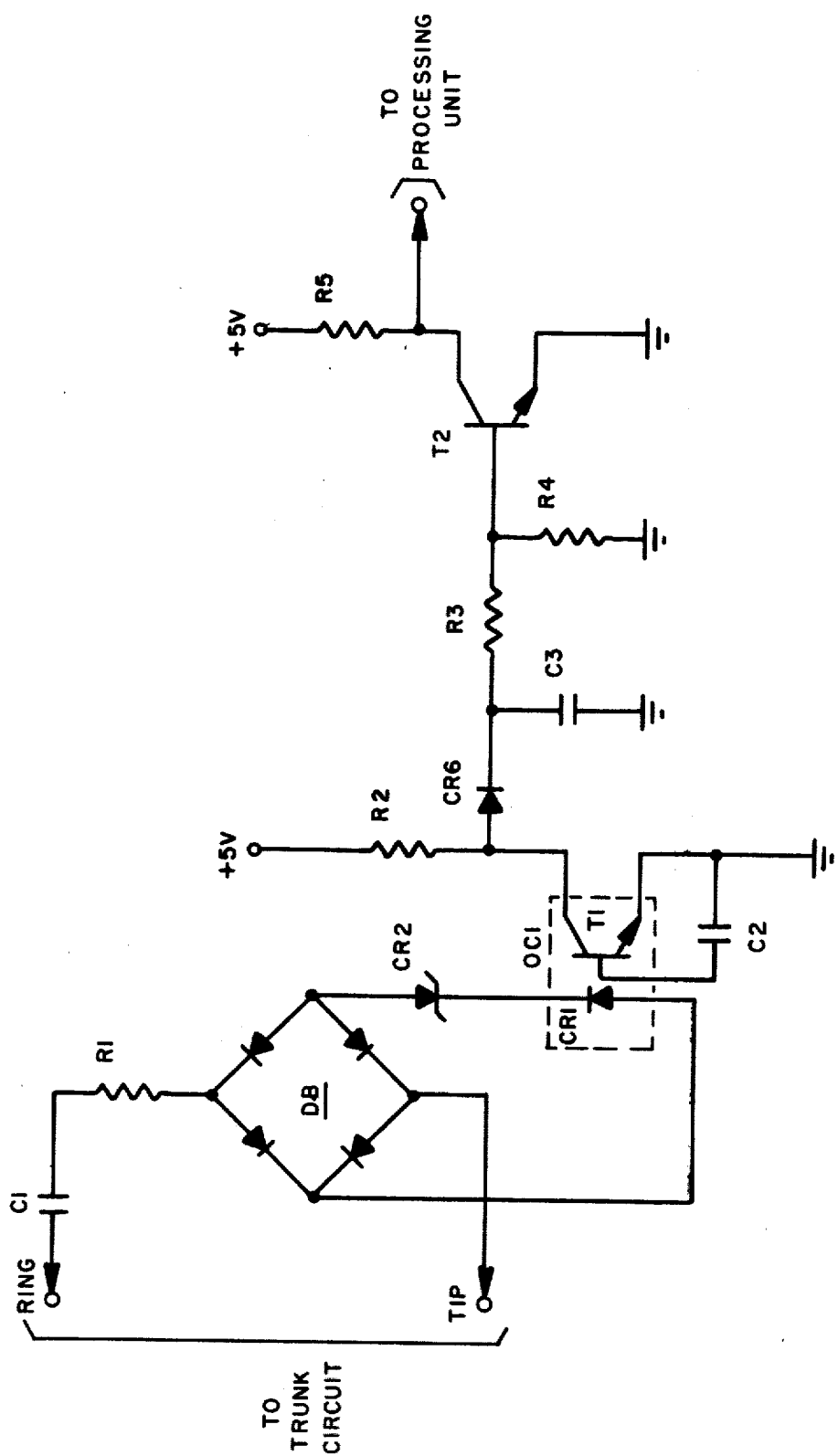

AC SUPERVISORY SIGNAL DETECTOR CIRCUIT

BACKGROUND OF THE INVENTION (1) Field of the Invention

The present invention relates to telephone trunk circuits and more particularly to an AC supervisory signal detector for use in a private automatic branch exchange to detect AC supervisory signals from a central office.

(2) Description of the Prior Art

The current state of the art in AC supervisory signal detectors is disclosed in U.S. Pat. No. 4,133,982 issued on Jan. 9, 1979 to D. Q. Lee, et al. However, this circuit suffers from a quick response time for detection of an AC supervisory signals and delayed recognition of removal of such signals. This quick response time, typically 20 milliseconds, increases the probability of erroneous detection of noise as a valid AC supervisory signal. The error represented by this false detection of an AC supervisory signal is compounded by the long response time, typically several hundred milliseconds, of this circuit to termination of a detected signal.

Accordingly, it is the object of the present invention to provide an AC supervisory signal detector which discriminates against noise signals and responds only to valid AC supervisory signals.

SUMMARY OF THE INVENTION

The present invention consists of an AC supervisory signal detector for use in a PABX trunk circuit for detection of ringing signals from a connected central office.

This circuit consists of an input impedance circuit providing an input impedance approximating the characteristic impedance of a telephone ringer. It is connected to a bridge circuit which drives an optical coupler through a zener diode. The optical coupler is connected to first and second timing circuits which are connected to an output buffer circuit.

The bridge circuit operates to provide the optical coupler with a ringing signal of a single polarity. The zener diode prevents noise signals from being applied to the optical coupler since only signals above the threshold breakdown voltage of the zener diode will cause current to flow in it and thus through the optical coupler. The first timing circuit includes resistor R2 and capacitor C3 and operates to provide a fast turn off time in response to removal of the input ringing signal. The second timing circuit includes capacitor C3, resistor R3 and resistor R4 and operates to provide a delayed response time to detection of a ringing signal. Transistor T2 is an inverting driver which provides a buffer between the timing circuits and the output of the detector circuit.

Thus the AC supervisory signal detector of the present invention discriminates between noise signals and valid AC supervisory signals through use of a delayed response time to detection of AC supervisory signals and a fast response time to removal of such signals.

DESCRIPTION OF THE DRAWING

The single FIGURE of the accompanying drawing is a schematic diagram of an AC supervisory signal detector in accordance with the present invention.

DESCRIPTION OF THE PREFERRED EMBODIMENT

Referring now to the accompanying drawing, the AC supervisory signal detector of the present invention is shown.

The AC supervisory signal detector is shown connected between a trunk circuit and a processing unit in a PABX which is connected to a control office. The series combination of capacitor C1, resistor R1 and diode bridge DB is shown connected across the trunk circuit via tip and ring leads. Diode bridge DB is also connected to zener diode CR2 which is connected to light emitting diode CR1 associated with optical coupler OC1. Capacitor C2 is connected to transistor T1, also associated with optical coupler OC1. Transistor T1 is also connected to resistor R2 and diode CR6 is further connected to capacitor C3. Capacitor C3 is further connected to resistor R3 which is connected to resistor R4 and transistor T2.

Capacitor C1 and resistor R1 are chosen to control the input impedance of the AC supervisory signal detector and approximate the characteristic impedance of a telephone ringer. Capacitor C1 also operates as a blocking capacitor to provide DC isolation.

When the central office applies a ringing signal to the tip and ring leads diode bridge DB detects the AC component of this ringing signal and rectifies it to a signal of a single polarity. This rectified ringing signal flows through light emitting diode CR1 if the amplitude of the ringing signal is sufficient to breakdown the threshold voltage of zener diode CR2. Thus zener diode CR2 prevents low amplitude noise signals from passing through optical coupler OC1 and thereby prevents detection of these noise signals as valid ringing signals. Under such conditions light emitting diode CR1 does not emit light and consequently transistor T1 remains off. Therefore, diode CR6 is forward biased and capacitor C3 charges exponentially through resistor R2 with a time constant of R2 C3. When capacitor C3 charges to a sufficient voltage for voltage divider R3 and R4 to forward bias transistor T2, it will turn on and generate a logic 0 output signal.

When an input ringing signal of sufficient amplitude to breakdown zener diode CR2 is detected, current flows through light emitting diode CR1 which causes transistor T1 to turn on. When transistor T1 turns on, it causes diode CR6 to become reverse biased. The ringing signal detection delay timing then operates to delay the indication of detection of an incoming ringing signal. This delay timing is provided by the operation of capacitor C3 discharging through resistor R3 and resistor R4 at an exponential rate of decay having a time constant of (R3+R4) C3. As capacitor C3 continues to discharge, a point is reached where the voltage divider, R3 and R4, provides insufficient voltage to keep transistor T2 turned on. The delay rate provided by capacitor C3, resistor R3 and resistor R4 is typically 100 milliseconds, which is sufficient to block noise signals having amplitudes sufficient to turn on zener diode CR2 since noise signals typically have a duration significantly less than 100 milliseconds. If the input signal was a valid ringing signal and is therefore present for more than 100 milliseconds, transistor T1 remains turned on and therefore, transistor T2 turns off upon expiration of the 100 millisecond detection delay timing. When transistor T2 turns off it generates a logic 1 output signal which indicates detection of a valid ringing signal.

Upon removal of the input ringing signal, current ceases to flow through light emitting diode CR1 and therefore transistor T1 turns off. Consequently diode CR6 again becomes forward biased and capacitor C3 charges exponentially through resistor R2 and diode CR6, with a time constant of R2 C3. This removal delay timing is approximately 20 milliseconds, after which capacitor C3 charges to sufficient voltage for voltage divider R3 and R4 to forward bias transistor T2, causing it to turn on and again generate a logic 0 signal to indicate the absence of a ringing signal.

Capacitor C2 is shown connected to transistor T1 and operates to provide stability to transistor T1 and prevent it from switching due to transient signals.

The ringing signal detector of the present invention not only discriminates between ringing sigals and noise signals of small amplitude but it also discriminates between valid ringing signals and noise signals of amplitudes approximating that of a valid signal but having durations less than 100 milliseconds. This circuit also provides a fast response time to termination of a ringing signal.

It will be obvious to those skilled in the art that numerous modifications of the present invention can be made without departing from the spirit of the invention which shall be limited only by the scope of the claims appended hereto.

What is claimed is:

1. An alterating current supervisory signal detector circuit for use in a first telephone switching system, connected to a second telephone switching system, said second telephone switching system operated to generate an alternating current supervisory signal, said alternating current supervisory signal detector comprising:

bridge rectifying means connected to said second telephone switching system, operated in response to said alternating current supervisory signal to convert said alternating current supervisory signal to a direct current supervisory signal;

threshold conducting means connected to said bridge rectifying means;

gating means connected to said threshold conducting means;

said threshold conducting means operated in response to a predetermined amplitude of said direct current supervisory signal to conduct said direct current supervisory signal to said gating means;

said gating means operated in response to said conducted direct current supervisory signal to generate a supervision detected signal;

a diode connected to said gating means;

a capacitor connected to said diode;

a voltage divider connected to said capacitor;

a resistor connected to said diode; and a power supply connected to said resistor;

said diode operated in response to said supervision detected signal to electrically disconnect said capacitor from said power supply, said capacitor operated in response to said disconnection from said power supply, to discharge through said voltage divider at a rate determined by the electrical characteristics of said capacitor and said voltage divider, whereby said capacitor generates a disable signal upon reaching a first predetermined potential;

said diode further operated in response to termination of said supervision detected signal to electrically connect said capacitor to said power supply via said resistor, said capacitor operated to charge to a second predetermined potential in response to current flow from said power supply through said resistor and said capacitor, at a rate determined by the electrical characteristics of said capacitor and said resistor, whereby said capacitor generates an enable signal upon reaching said second predetermined potential;

buffer means connected to said voltage divider, operated in response to said disable signal, to generate a delayed supervision detected signal; and said buffer means further operated in response to said enable signal to terminate generation of said delayed supervision detected signal.

2. An alternating current supervisory signal detector circuit as claimed in claim 1, wherein said gating means comprises an optical coupler.

3. An alternating current supervisory signal detector circuit as claimed in claim 2, wherein said optical coupler includes a photosensitive transistor having base and emitter leads, said gating means further comprising a capacitor connected to said base and emitter leads, operated to store energy developed across said base and emitter leads, whereby generation and termination of said supervision detected signal are delayed.

4. An alternating current supervisory signal detector circuit as claimed in claim 1, wherein said threshold conducting means consists of a zener diode.

5. An alternating current supervisory signal detector circuit as claimed in claim 1, wherein said buffer means comprises an inverting transistor.

* * * * *